(12) United States Patent
Delaney et al.

(10) Patent No.: US 10,618,664 B2
(45) Date of Patent: Apr. 14, 2020

(54) SELF-LATCHING NACELLE

(71) Applicant: ROHR, INC., Chula Vista, CA (US)

(72) Inventors: Mac Patrick Delaney, San Diego, CA (US); Colin R. Terrey, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 483 days.

(21) Appl. No.: 15/625,789

(22) Filed: Jun. 16, 2017

(65) Prior Publication Data

US 2018/0362173 A1  Dec. 20, 2018

(51) Int. Cl.
| | |
|---|---|
| *B64D 29/06* | (2006.01) |
| *F02K 3/06* | (2006.01) |
| *F01D 25/24* | (2006.01) |
| *B64D 29/08* | (2006.01) |

(52) U.S. Cl.
CPC ............. *B64D 29/06* (2013.01); *B64D 29/08* (2013.01); *F01D 25/24* (2013.01); *F02K 3/06* (2013.01); *F05D 2220/323* (2013.01); *F05D 2220/36* (2013.01); *F05D 2240/14* (2013.01); *F05D 2260/36* (2013.01); *F05D 2260/38* (2013.01)

(58) Field of Classification Search
CPC ......... B64D 29/06; B64D 29/08; F01D 25/24; F02K 3/06; F05D 2220/323; F05D 2220/36; F05D 2240/14; F05D 2260/36; F05D 2260/38
See application file for complete search history.

(56) References Cited

U.S. PATENT DOCUMENTS

| | | | |
|---|---|---|---|
| 2,564,530 A * | 8/1951 | Guery | B64D 29/06 |
| | | | 123/41.7 |
| 4,549,708 A | 10/1985 | Norris | |
| 4,658,579 A | 4/1987 | Bower et al. | |
| 5,046,689 A | 9/1991 | Shine | E05B 79/06 |
| 10,399,688 B2 * | 9/2019 | Delaney | E05B 79/06 |
| 2005/0102996 A1 * | 5/2005 | Lair | E05B 47/0607 |
| | | | 60/226.2 |
| 2005/0151012 A1 * | 7/2005 | Lair | F02K 1/70 |
| | | | 244/110 B |
| 2010/0308174 A1 * | 12/2010 | Calverley | B64C 27/02 |
| | | | 244/155 A |
| 2016/0281539 A1 | 9/2016 | Linde et al. | |
| 2017/0192425 A1 * | 7/2017 | Duda | B64G 6/00 |

* cited by examiner

*Primary Examiner* — Rodney A Bonnette
(74) *Attorney, Agent, or Firm* — Snell & Wilmer L.L.P.

(57) ABSTRACT

A nacelle may include fan cowl panels which may be opened to provide access to the fan case. A self-locking latch may automatically lock when the fan cowl panels are closed. A manual release button may disengage the self-locking latch in order to open the fan cowl panels.

17 Claims, 7 Drawing Sheets

SELF-LATCHING NACELLE

FIELD

The disclosure generally relates to turbofan propulsion systems for aircraft. More particularly, the disclosure relates to latches for a nacelle in a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a fan cowl which forms the outer portion of the nacelle in the area of the fan case. The fan cowl typically has two halves which may hinge open to provide access to the fan case and any components mounted on it, which sometimes includes a lube oil sump and pump, the computer for controlling the engine, etc. Similarly, nacelle thrust reversers may comprise two halves that are coupled to the nacelle via one or more hinges.

Latches have been used to latch the fan cowl halves and thrust reverser halves to each other, but these existing latches may suffer from various disadvantages or insufficiencies. For example, in the event that the latch is not manually engaged prior to engine operation, the fan cowl halves are not secured. The location of the latches may be obscured from quick visual inspection. Thus, it is possible for unlatched fan cowl halves to go unnoticed should the latches not be properly inspected, and an aircraft may takeoff with unlatched fan cowl halves. The fan cowl halves may separate from the nacelle during flight if the latches are not secured.

SUMMARY

A propulsion system may comprise a first nacelle panel and a second nacelle panel both configured to rotate between a closed position and an open position which permits access to an engine case; and a self-locking latch configured to automatically lock the first nacelle panel to the engine case in response to the first nacelle panel closing.

In various embodiments, the self-locking latch may comprise a spool. The self-locking latch may comprise a tether located at least partially within the spool. The spool may be coupled to the engine case, and the tether may be coupled to the first nacelle panel. A self-locking release button may be located on the first nacelle panel. The self-locking latch may comprise a base, a keeper, and a strike rod. The strike rod may be coupled to the first nacelle panel.

A propulsion system for an aircraft may comprise a first nacelle component rotatable about a first hinge and a second nacelle component rotatable about a second hinge, wherein the first nacelle component and the second nacelle component are rotatable between a closed position in which the first nacelle component and the second nacelle component form an exterior of an aircraft nacelle, and an open position in which the first nacelle component and the second nacelle component are separated; and a self-locking latch configured to prevent the first nacelle component from opening, wherein the self-locking latch comprises a spool and a tether coupling the first nacelle component to an engine case.

In various embodiments, the spool may be coupled to the engine case, and the tether may be coupled to the first nacelle component. The first nacelle component may be a fan cowl panel. The spool may comprise a release button. The self-locking latch may be configured to lock in response to the first nacelle component closing. The spool may be configured to retract the tether in response to the first nacelle component closing. The tether may comprise a metal cable. The spool may be configured to pay out the tether in response to a release button being pressed.

A propulsion system may comprise a fan cowl panel rotatable between an open position and a closed position; an engine case; a strike bar coupled to the fan cowl panel or the engine case; a base coupled to the fan cowl panel or the engine case; and a keeper coupled to the base, wherein the strike bar is located between the base and the keeper, and wherein contact between the strike bar and the keeper prevents the fan cowl panel from opening.

In various embodiments, the strike bar may be coupled to the fan cowl panel, and the base may be coupled to the engine case. The fan cowl panel may comprise a button configured to disengage the keeper. The keeper may be configured to lock the fan cowl panel in the closed position in response to the fan cowl panel closing. The keeper may be configured to rotate about a pivot.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for latching nacelle components are disclosed. Latches may be employed to close and secure fan cowl panels or thrust reverser halves together for flight. A latch is preferable to a permanent mechanical attachment of the fan cowl panels because the fan cowl panels should be removable or openable by ground support personnel in order to reach the fan case for inspection and servicing.

Self-locking mechanisms may automatically latch when a fan cowl panel or thrust reverser half (collectively "nacelle panel") is closed. Such a self-locking mechanism may constitute a secondary lock in addition to the primary tension latching system, and provide a second line of defense against inadvertent fan cowl opening during flight. The self-locking mechanism automatically locks closed when the fan cowl panels are closed, without any manual intervention from maintenance personnel, in order to assure that the self-locking latch is locked and ready to keep the fan cowls closed.

As one example, the self-locking mechanisms may include an auto-retracting spool. The spool may be attached to either the fan cowl panel or the engine case or other fixed structure of the engine or nacelle. The spool may include a cable which is attached to the other of the engine case or the fan cowl panel. The spool may include a release feature which allows the cable to extend from the spool in order for the fan cowl panel to open. When the fan cowl panel is subsequently closed, the spool may retract the cable, and the spool may prevent the fan cowl panel from opening unless the release feature is activated. As another example, the self-locking mechanism may include a strike bar on the nacelle and a keeper on the fan cowl panel.

Figure 1:
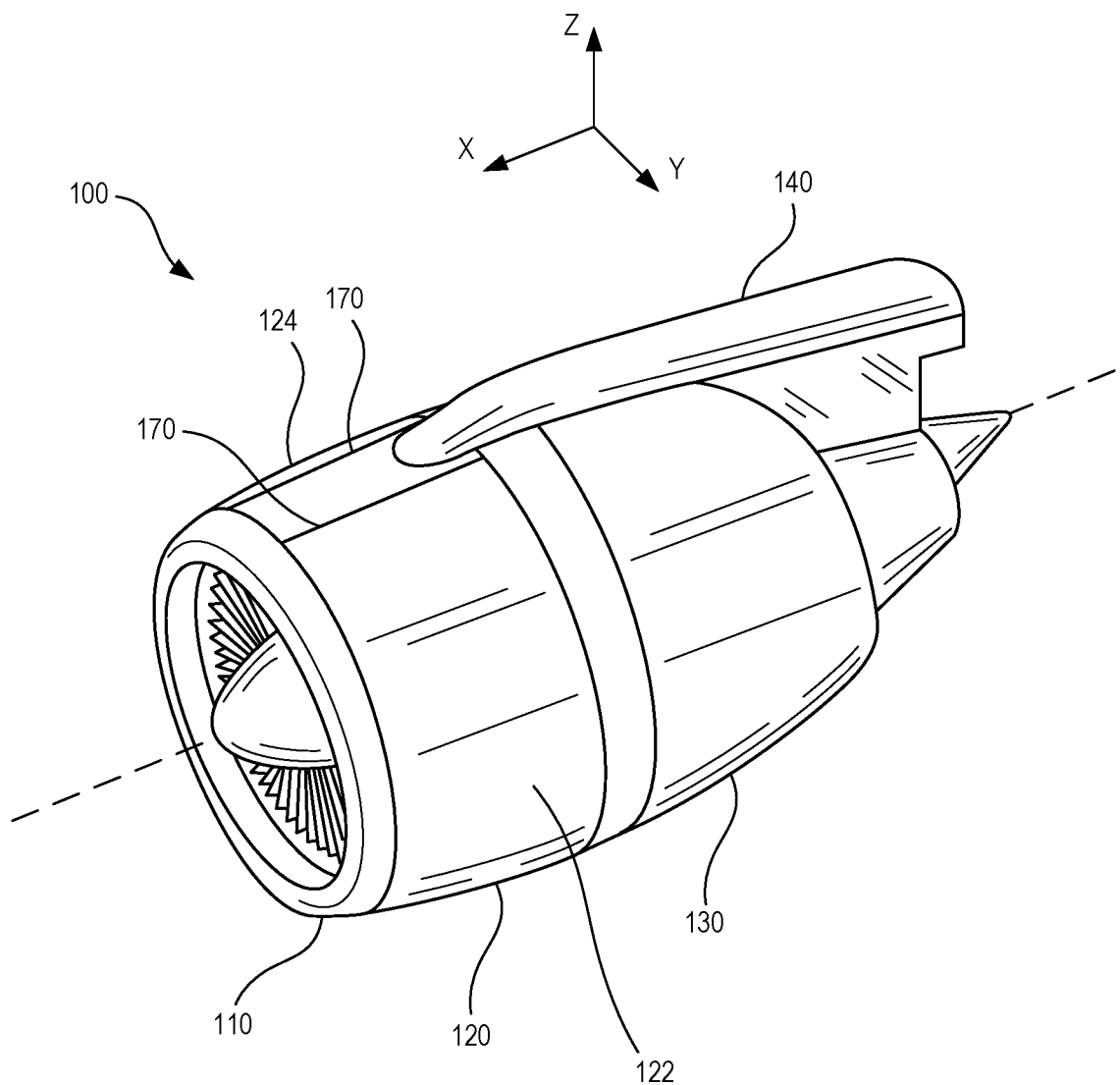
FIG. 1 illustrates a perspective view of a nacelle in accordance with various embodiments of the disclosure.

Referring to FIG. 1, a nacelle 100 for a gas turbine engine is illustrated according to various embodiments. X-y-z axes are shown for ease of illustration. As used herein, the term forward represents the positive x-direction, the term rear or aft represents the negative x-direction, the term left represents the positive y-direction, the term right represents the negative y-direction, the term down represents the negative z-direction, and the term up represents the positive z-direction. As used herein, the direction "right" is equivalent to starboard, and refers to the right side of the aircraft when facing forward. Similarly, the direction "left" is equivalent to port, and refers to the left side of the aircraft when facing forward. Nacelle 100 may comprise an inlet 110, a fan cowl 120, and a thrust reverser 130. Nacelle 100 may be coupled to a pylon 140, which may mount the nacelle 100 to an aircraft wing or aircraft body.

The fan cowl 120 may comprise a left fan cowl panel 122 and a right fan cowl panel 124. The left fan cowl panel 122 and the right fan cowl panel 124 may hinge open at hinges 170. The left fan cowl panel 122 and the right fan cowl panel 124 may hinge open at hinges 170 in order to provide access to the fan case for inspection or servicing. The left fan cowl panel 122 and the right fan cowl panel 124 may together form a portion of the exterior of the nacelle 100 when the left fan cowl panel 122 and the right fan cowl panel 124 are closed. The left fan cowl panel 122 and the right fan cowl panel 124 may be latched together at the bottom of the nacelle 100 where the left fan cowl panel 122 and the right fan cowl panel 124 meet.

Figure 2:
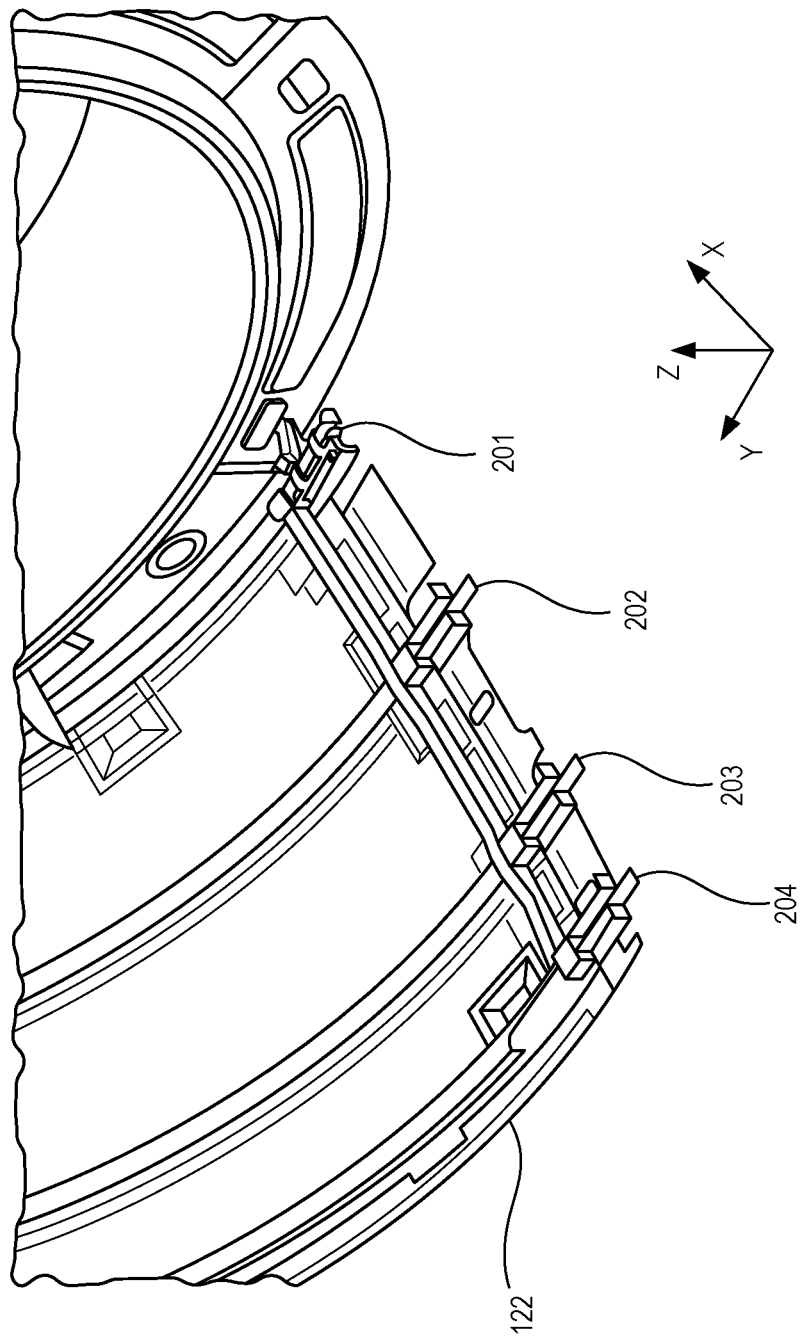
FIG. 2 illustrates an interior view of a left fan cowl panel in accordance with various embodiments of the disclosure.

Referring to FIG. 2, a perspective view of the interior of the left fan cowl panel 122 is illustrated according to various embodiments. The right fan cowl panel 124 is not shown in FIG. 2 for ease of illustration. The left fan cowl panel 122 may be coupled to the right fan cowl panel 124 by a series of latches. A number one latch 201 may be the most forward latch. A number two latch 202, a number three latch 203, and a number four latch 204 may be located aft of the number one latch 201. Nacelles may comprise any suitable number of fan cowl latches, such as one, two, three, four, or any other suitable number depending on design specifications. In addition to the illustrated latches, the nacelle may comprise one or more self-locking latches as further described herein.

Figure 3:
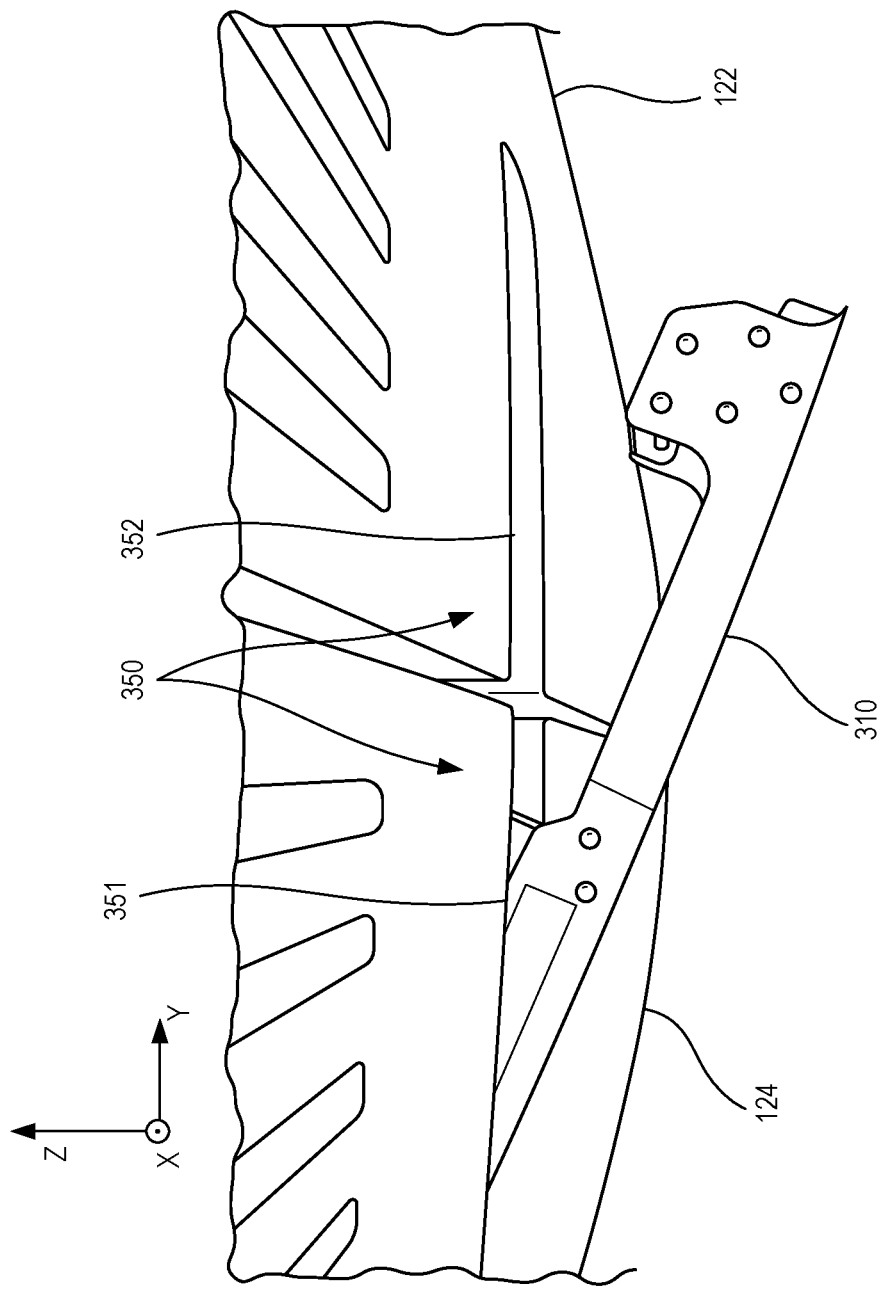
FIG. 3 illustrates a perspective view of a latch mechanism for a fan cowl in accordance with various embodiments of the disclosure.

Referring to FIG. 3, a perspective view of a partially opened latch handle 310 from the exterior of the nacelle 100 is illustrated according to various embodiments. The latch handle 310 may be rotated in a clockwise direction in the illustration to unlatch the right fan cowl panel 124 from the left fan cowl panel 122. The latch handle 310 may be rotated in a counter-clockwise direction in the illustration to latch the right fan cowl panel 124 to the left fan cowl panel 122. The latch handle 310 may pivot about a fulcrum (obscured by the right fan cowl panel 124) in a proximal half 351 of a latch housing 350. Maintenance personnel may open or close the latch handle 310 in order to open or close the fan cowl panels 122, 124.

Figure 4:
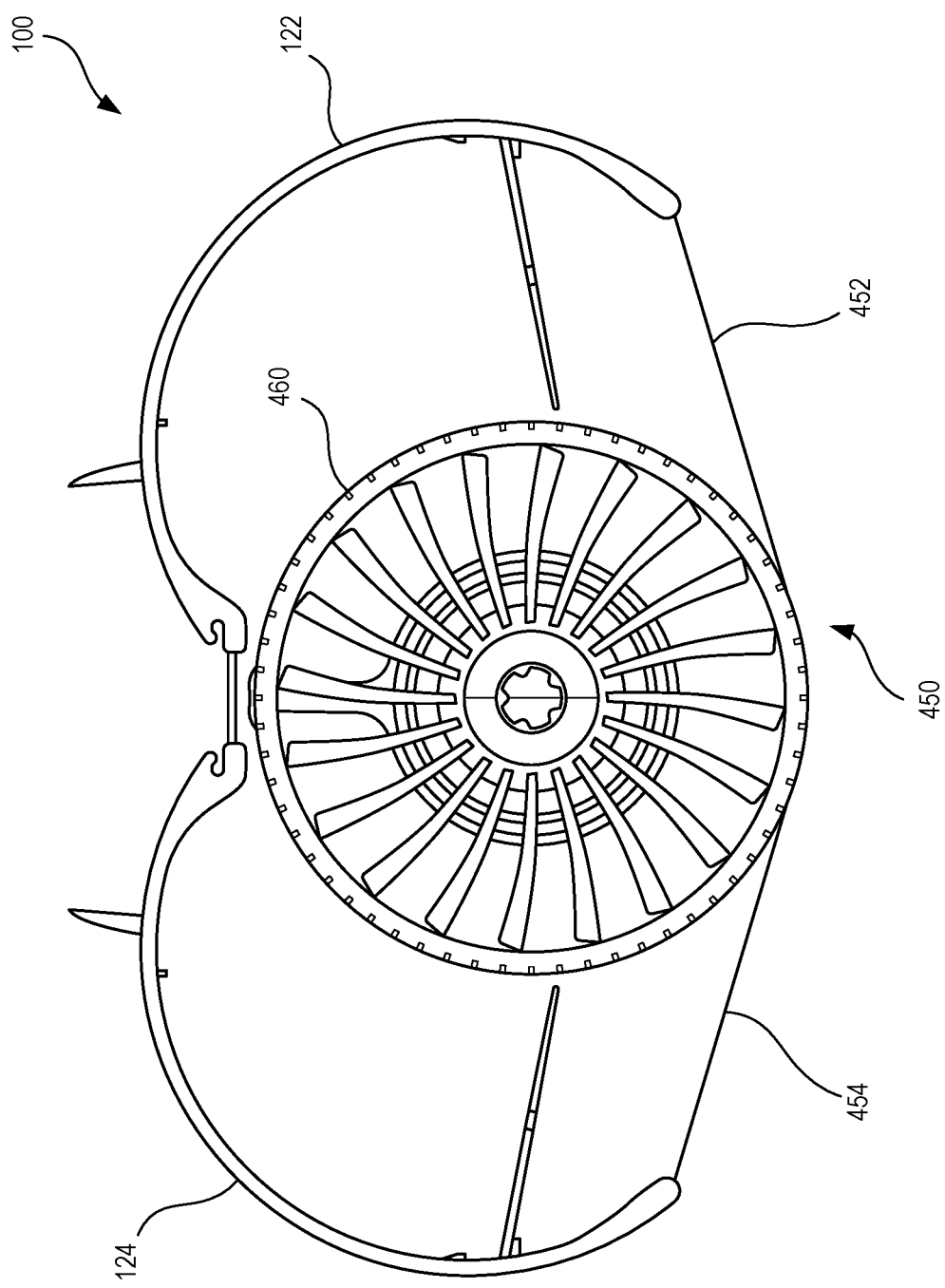
FIG. 4 illustrates a front view of a nacelle with the fan cowl panels open in accordance with various embodiments of the disclosure.

Referring to FIG. 4, a front view of the nacelle 100 with a right fan cowl panel 124 and a left fan cowl panel 122 in the open position is illustrated according to various embodiments. The nacelle 100 may comprise a self-locking latch 450. Self-locking latches automatically lock when nacelle panels are closed. Self-locking latches may be utilized as a backup for the latches shown in FIG. 2 in the event that the latches shown in FIG. 2 are not closed prior to flight. A right tether 454 may be coupled to the right fan cowl panel 124 and the engine case 460. As used herein, an "engine case" includes the fan case, as well as the casing which surrounds the compressor, combustor, and turbine sections of an engine, or any other fixed structure of the engine or nacelle. A left tether 452 may be coupled to the left fan cowl panel 122 and the engine case 460. As illustrated, the right tether 454 and the left tether 452 may be coupled to the engine case 460 at the bottom of the engine case 460 and the bottoms of the right fan cowl panel 124 and left fan cowl panel 122. However, in various embodiments, the right tether 454 and the left tether 452 may be located at any suitable locations on the engine case 460, the right fan cowl panel 124, and the left fan cowl panel 122.

Figure 5:
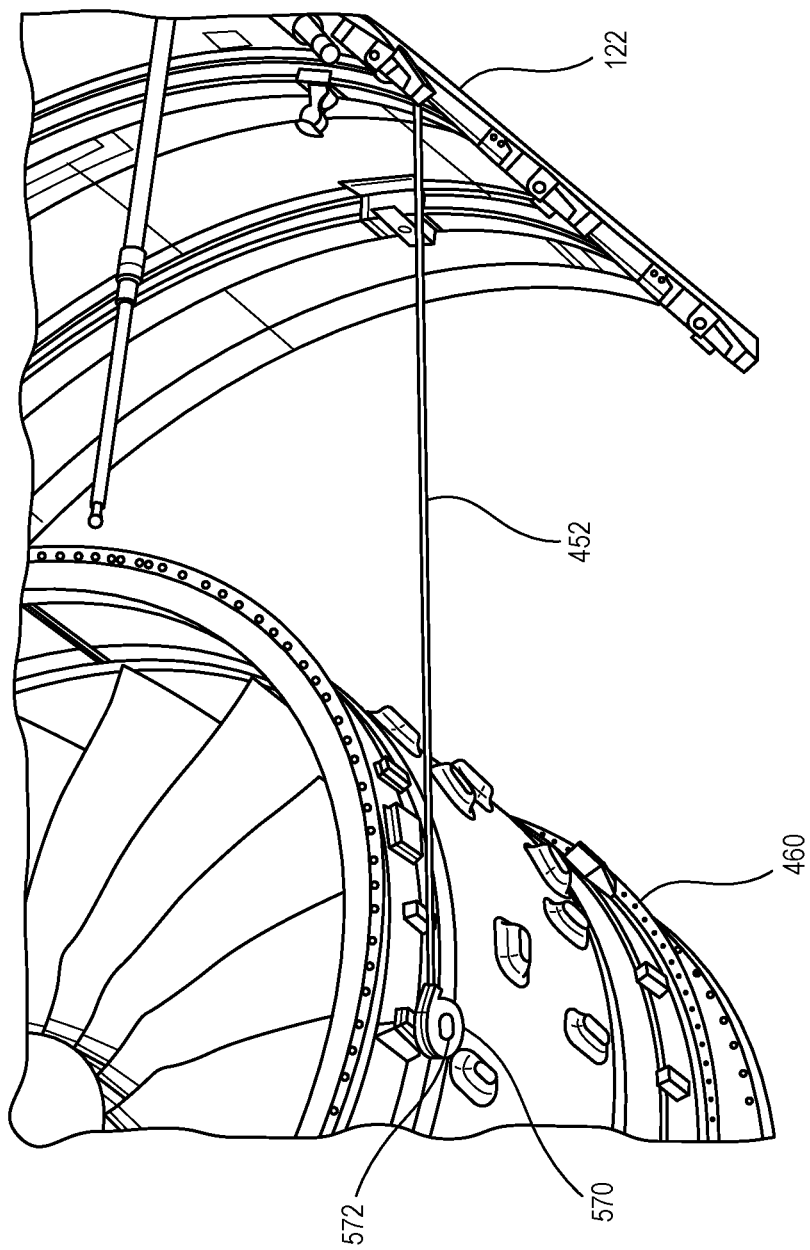
FIG. 5 illustrates a perspective view of a nacelle with a spool and tether in accordance with various embodiments of the disclosure.

Referring to FIG. 5, a perspective view of the engine case 460 and the left fan cowl panel 122 is illustrated according to various embodiments. The left tether 452 may couple the left fan cowl panel 122 to the engine case 460. In various embodiments, the left tether 452 may comprise a steel cable, a nylon cord, or any other suitable material for coupling the left fan cowl panel 122 to the engine case 460. While the left fan cowl panel 122 is open for maintenance, the left tether 452 may remain coupled to the engine case 460 and the left fan cowl panel 122. A spool 570 may be coupled to the engine case 460. The spool 570 may automatically retract the left tether 452 as the left fan cowl panel 122 is closed. For example, the spool 570 may comprise a spring which causes the left tether 452 to retract into the spool 570. When the left fan cowl panel 122 is closed and the left tether 452 is retracted within the spool 570, the spool 570 may prevent the right tether 454 from extending unless a release feature, such as release button 572 is activated. Thus, even if maintenance personnel do not close the primary latches described in FIG. 2, the spool 570 and left tether 452 may prevent the left fan cowl panel 122 from opening during flight. If the left fan cowl panel 122 were to open even one inch or more during flight, the drag force may be so great as to tear the left fan cowl panel 122 from the nacelle. However, because the spool 570 locks and prevents the left tether 452 from extending, the spool 570 may permit only minimal deflections of the left fan cowl panel 122 during flight, and the strength of the left tether 452 may be greater than the aerodynamic force on the left fan cowl panel 122 exerted from the high speed slip stream. Thus, the spool 570 and the left tether 452 may prevent loss of the left fan cowl panel 122. Although described with reference to the left half of the nacelle, similar features may be used in the right half of the nacelle.

Figure 6A:
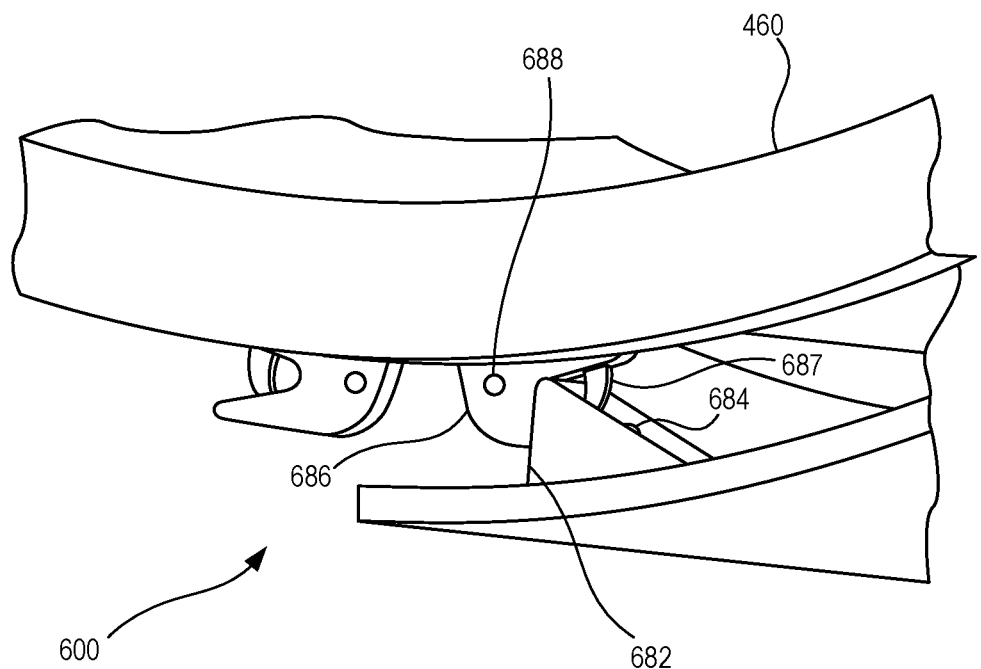
FIG. 6A illustrates a perspective view of a self-locking nacelle with a strike bar and keeper in accordance with various embodiments of the disclosure.
Figure 6B:
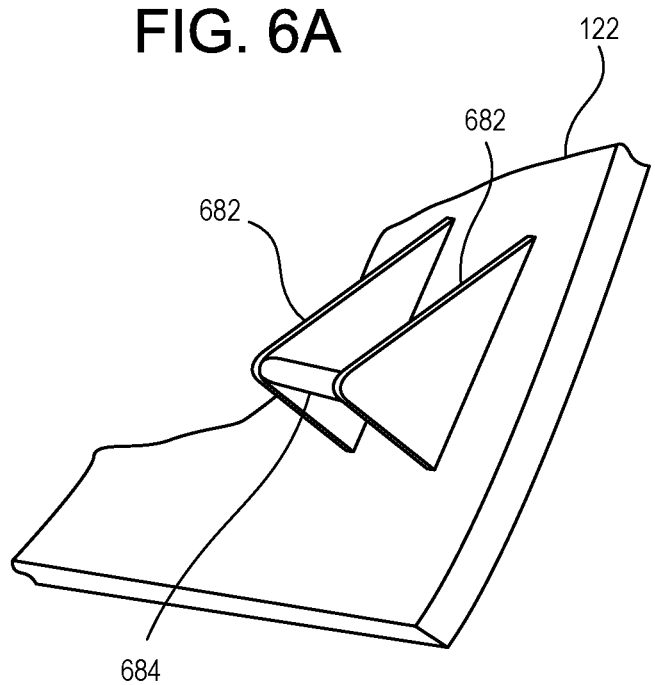
FIG. 6B illustrates a perspective view of a left fan cowl panel with a strike bar in accordance with various embodiments of the disclosure.

Referring to FIG. 6A and FIG. 6B, perspective views of a self-locking latch 600 having a strike bar 684, a base 686, and a keeper 687 are illustrated according to various embodiments. One or more strike supports 682 may be coupled to the left fan cowl panel 122. The strike supports 682 may be parallel to each other and normal to the surface of the left fan cowl panel 122. A strike bar 684 may extend between the strike supports 682. The strike bar 684 may be cylindrical.

A base 686 may be coupled to the engine case 460. A keeper 687 may be coupled to the base 686. The keeper 687 may be rotatable about a pivot 688. In response to the left fan cowl panel 122 closing, the strike bar 684 may contact the keeper 687, causing the keeper 687 to rotate in a first direction (counter-clockwise as shown). The left fan cowl panel 122 may continue closing until the strike bar 684 contacts the base 686, and the strike bar 684 no longer interferes with the keeper 687. The keeper 687 may then rotate in the opposite direction, either as a result of gravity or a spring, and the keeper 687 may lock the strike bar 684 between the keeper 687 and the base 686. Absent an external force on the keeper 687, the automatic nacelle latch may remain locked and keep the left fan cowl panel 122 in the closed position. Thus, even if maintenance personnel do not close the primary latches described in FIG. 2, the self-locking latch 600 may prevent the left fan cowl panel 122 from opening during flight.

In various embodiments, the base 686 may be coupled to the left fan cowl panel 122, and the strike bar 684 may be coupled to the engine case 460. Although described with reference to the left half of the nacelle, similar features may be used in the right half of the nacelle.

Figure 7:
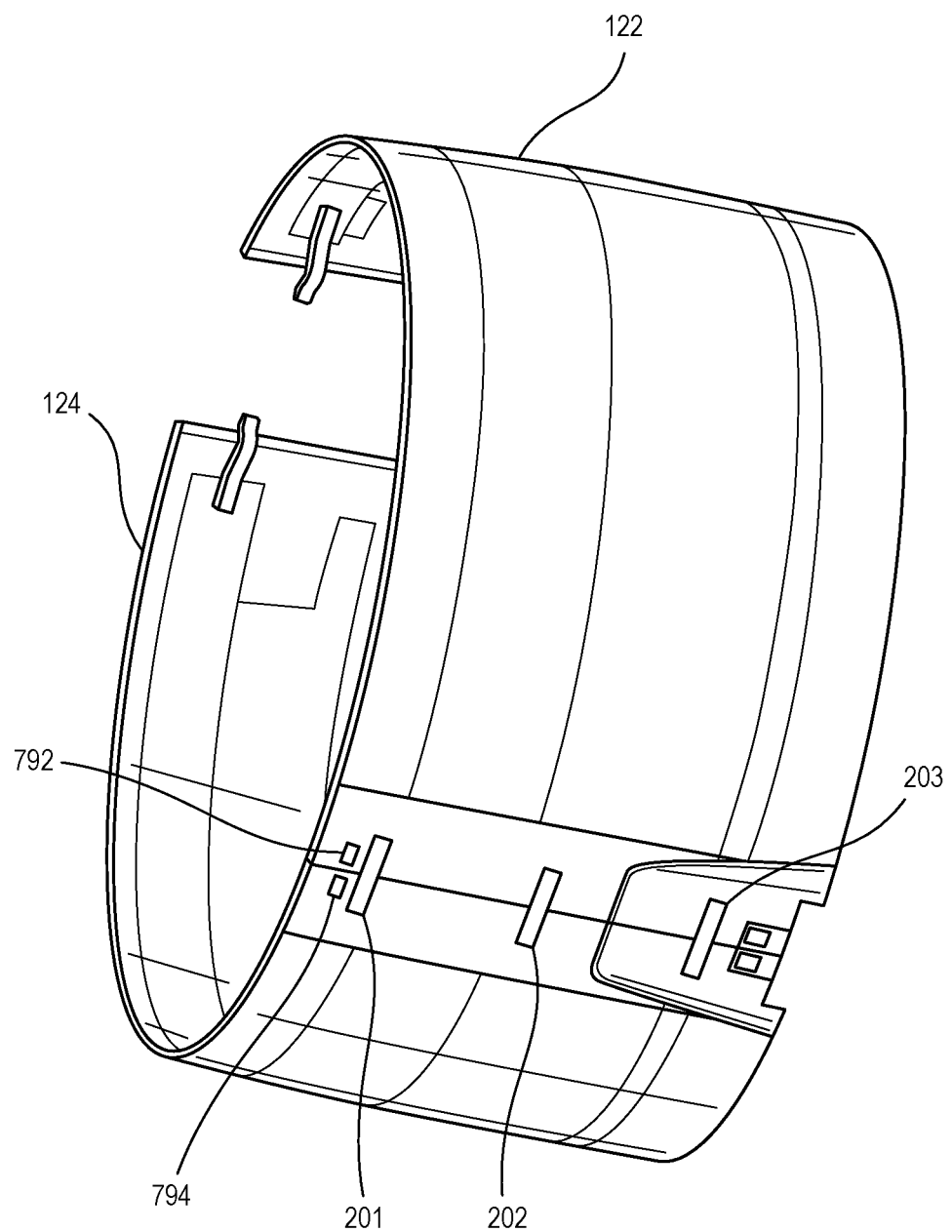
FIG. 7 illustrates a perspective view of two fan cowl panels latched together in accordance with various embodiments of the disclosure.

Referring to FIG. 7, an exterior view of the right fan cowl panel 124 and the left fan cowl panel 122 in a closed position is illustrated according to various embodiments. The number one latch 201, the number two latch 202, and the number three latch 203 may latch the right fan cowl panel 124 and the left fan cowl panel 122 together. In order to open the fan cowl panels 122, 124, the number one latch 201, the number two latch 202, and the number three latch 203 may first be opened.

The right fan cowl panel 124 may comprise a right self-locking release button 794, and the left fan cowl panel 122 may comprise a left self-locking release button 792. The self-locking release buttons 792, 794 may be located on an exterior of the fan cowl panels 122, 124 so that maintenance personnel can access the self-locking release buttons while the fan cowl panels 122, 124 are latched together. In response to the left self-locking release button 792 being pressed, the left self-locking release button 792 may contact and unlock a self-locking latch, such as by contacting the release button 572 shown in FIG. 5 or the keeper 687 shown in FIG. 6A and FIG. 6B. The left fan cowl panel 124 may then be opened. The similar process may be used for the right fan cowl panel 122.

Although the latching mechanism is illustrated as latching two fan cowl panels together, it could also be readily adapted as a latching mechanism which extends between an inner fixed structure (IFS) half and the engine, or between the two (left and right) IFS halves, or at any other nacelle location which utilizes latches.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A propulsion system comprising:
    a first nacelle panel and a second nacelle panel both configured to rotate between a closed position and an open position; and
    a self-locking latch configured to automatically lock the first nacelle panel to the engine case in response to the first nacelle panel closing, and
    a self-locking release button on the first nacelle panel.

2. The propulsion system of claim 1, wherein the self-locking latch comprises a spool.

3. The propulsion system of claim 2, wherein the self-locking latch further comprises a tether located at least partially within the spool.

4. The propulsion system of claim 3, wherein the spool is coupled to the engine case, and wherein the tether is coupled to the first nacelle panel.

5. The propulsion system of claim 1, wherein the self-locking latch comprises a base, a keeper, and a strike rod.

6. The propulsion system of claim 5, wherein the strike rod is coupled to the first nacelle panel.

7. A propulsion system for an aircraft comprising:
    a first nacelle component rotatable about a first hinge and a second nacelle component rotatable about a second hinge, wherein the first nacelle component and the second nacelle component are rotatable between a closed position in which the first nacelle component and the second nacelle component form an exterior of an aircraft nacelle, and an open position in which the first nacelle component and the second nacelle component are separated; and
    a self-locking latch configured to prevent the first nacelle component from opening, wherein the self-locking latch comprises a spool and a tether coupling the first nacelle component to an engine case, and the spool comprises a release button.

8. The propulsion system of claim 7, wherein the spool is coupled to the engine case, and wherein the tether is coupled to the first nacelle component.

9. The propulsion system of claim 7, wherein the first nacelle component is a fan cowl panel.

10. The propulsion system of claim 7, wherein the self-locking latch is configured to lock in response to the first nacelle component closing.

11. The propulsion system of claim 7, wherein the spool is configured to retract the tether in response to the first nacelle component closing.

12. The propulsion system of claim 7, wherein the tether comprises a metal cable.

13. The propulsion system of claim 7, wherein the spool is configured to extend the tether in response to the release button being pressed.

14. A propulsion system comprising:
    a fan cowl panel rotatable between an open position and a closed position;
    an engine case;
    a strike bar coupled to the fan cowl panel or the engine case;
    a base coupled to the fan cowl panel or the engine case; and
    a keeper coupled to the base,
    wherein the strike bar is located between the base and the keeper, and wherein contact between the strike bar and the keeper prevents the fan cowl panel from opening, and
    the fan cowl panel comprises a button configured to disengage the keeper.

15. The propulsion system of claim 14, wherein the strike bar is coupled to the fan cowl panel, and wherein the base is coupled to the engine case.

16. The propulsion system of claim 14, wherein the keeper is configured to lock the fan cowl panel in the closed position in response to the fan cowl panel closing.

17. The propulsion system of claim 14, wherein the keeper is configured to rotate about a pivot.

\* \* \* \* \*